L. C. SHARP.
MACHINE FOR MAKING PASTRY SHELLS.
APPLICATION FILED JUNE 9, 1913. RENEWED MAY 19, 1915.
1,151,298.
Patented Aug. 24, 1915.
4 SHEETS—SHEET 4.
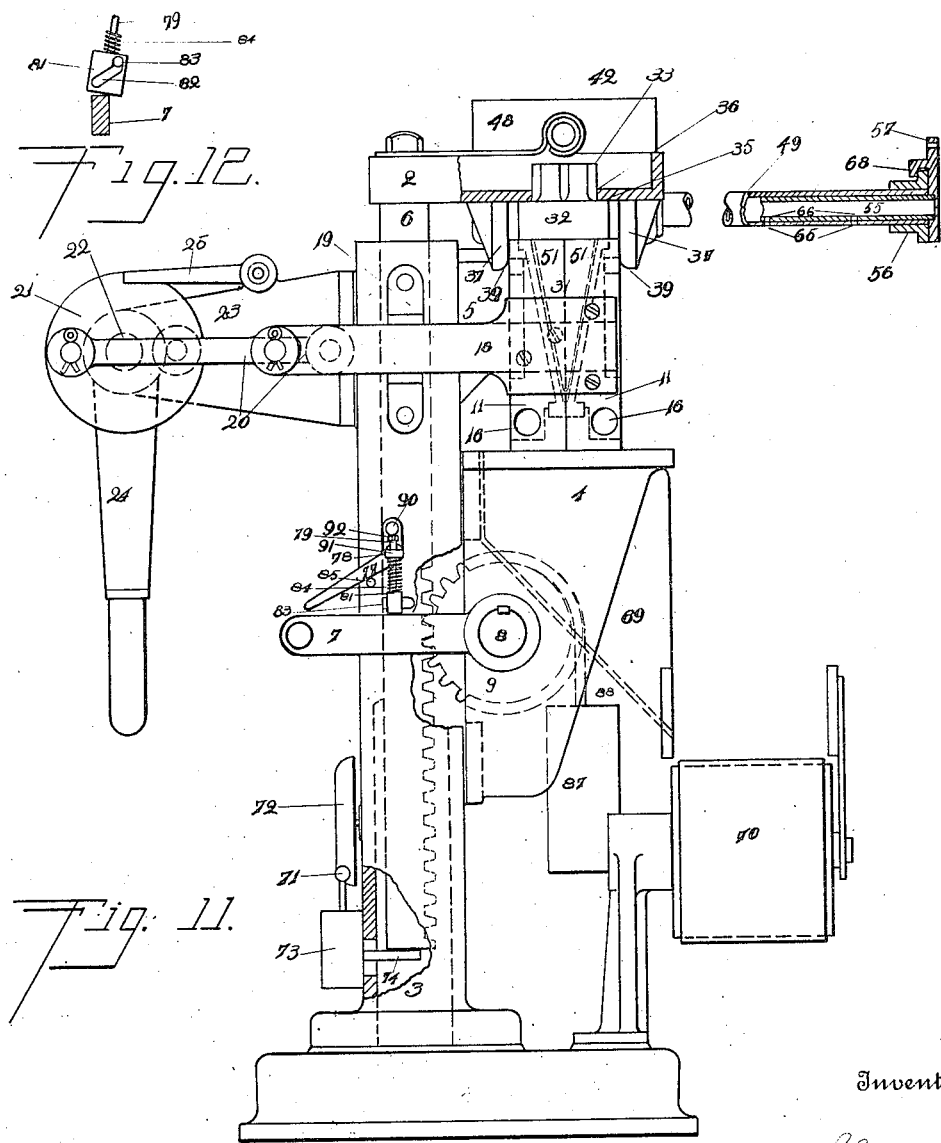

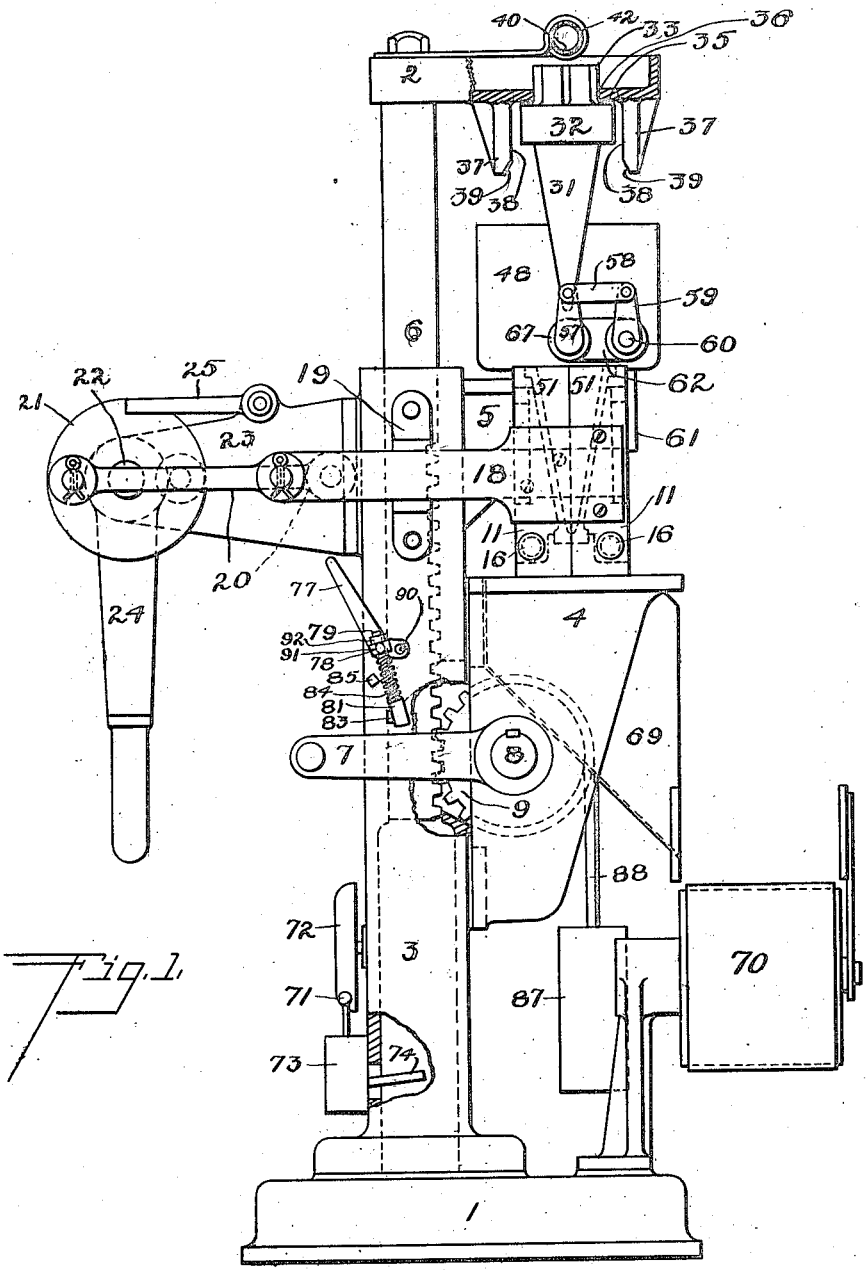

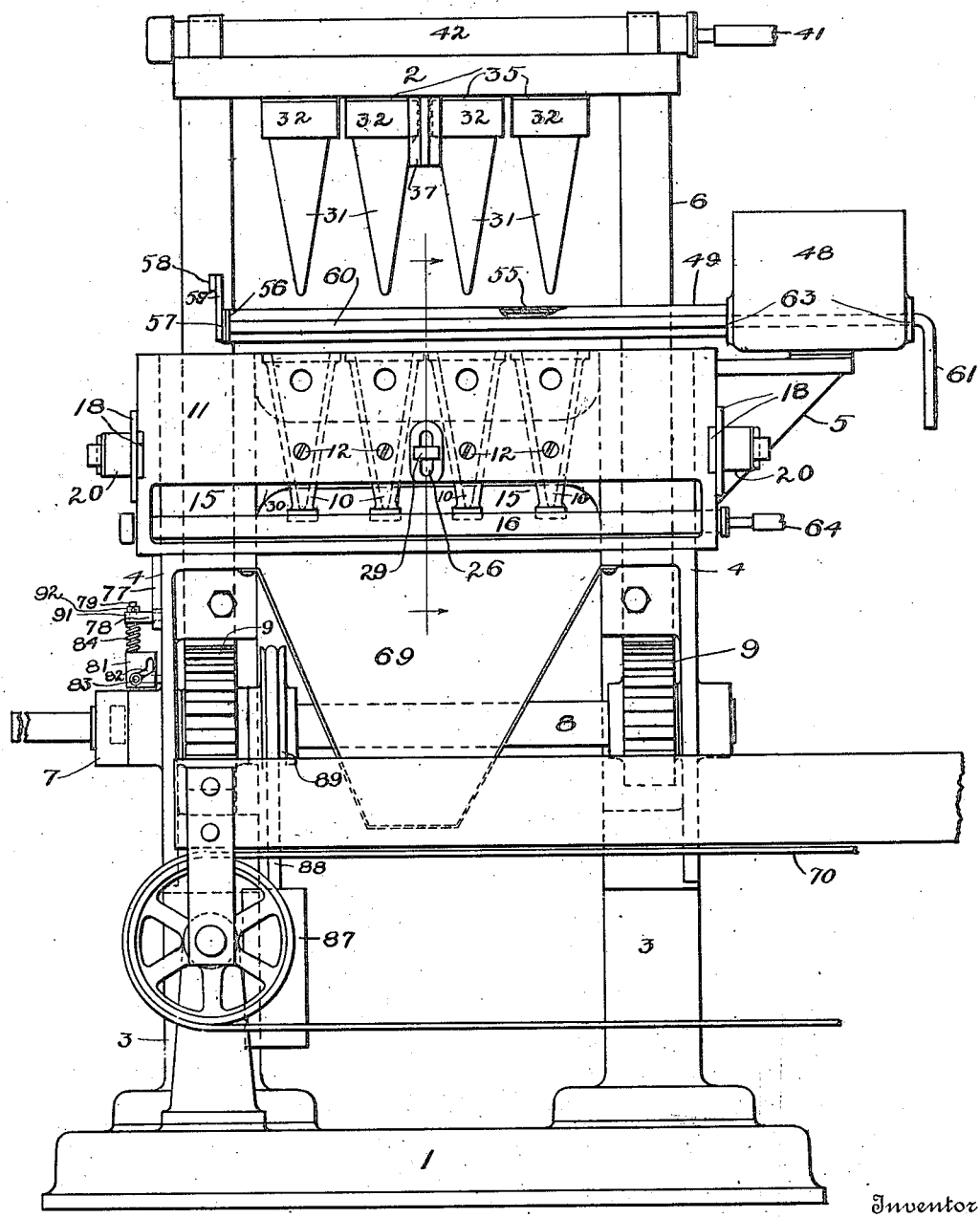

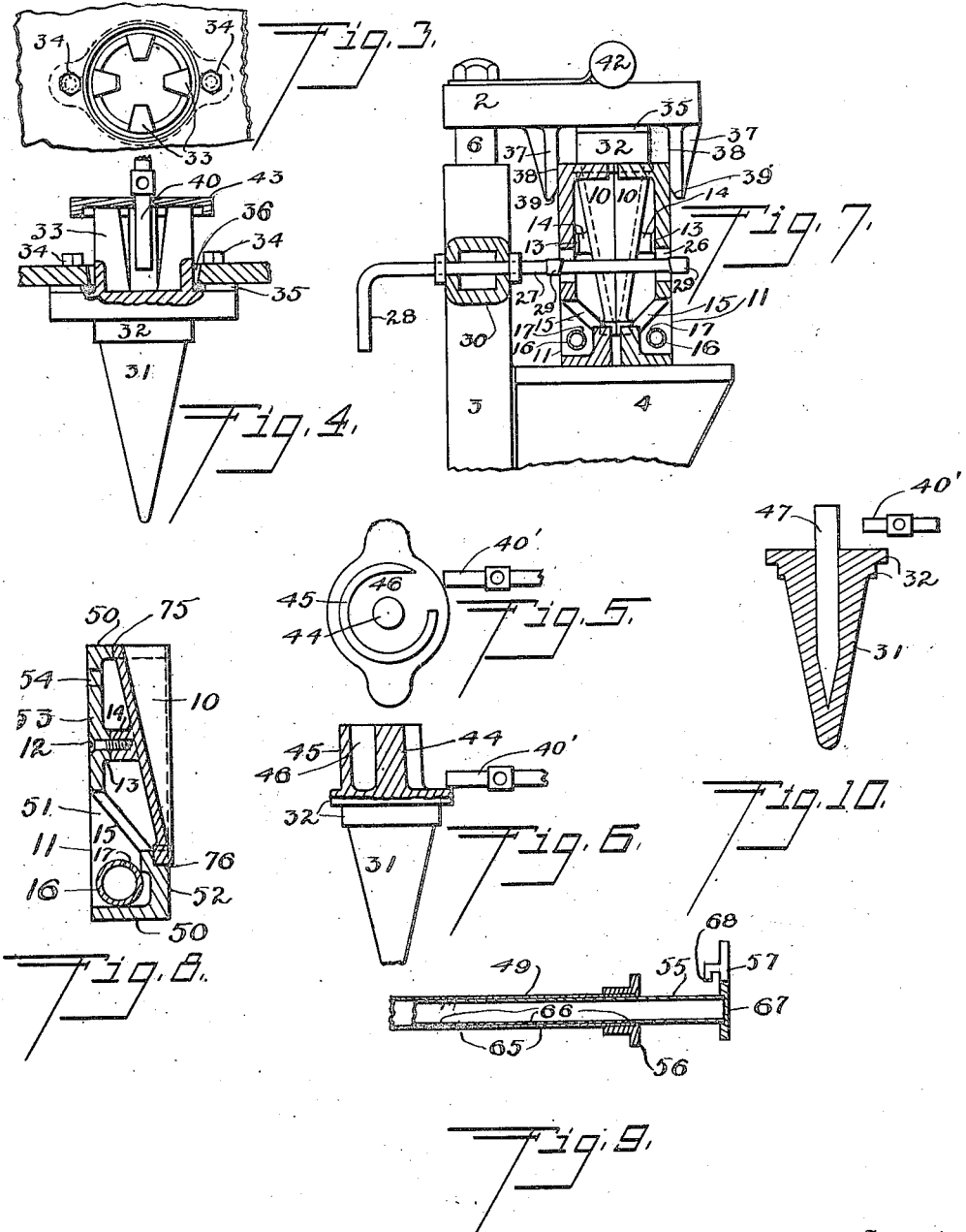

UNITED STATES PATENT OFFICE.

LEE C. SHARP, OF PLATTSMOUTH, NEBRASKA.

MACHINE FOR MAKING PASTRY SHELLS.

1,151,298. Specification of Letters Patent. Patented Aug. 24, 1915.

Application filed June 9, 1913, Serial No. 772,555. Renewed May 19, 1915. Serial No. 29,216.

*To all whom it may concern:*

Be it known that I, LEE C. SHARP, a citizen of the United States, residing at Plattsmouth, in the county of Cass, in the State of Nebraska, have invented certain new and useful Improvements in Machines for Making Pastry Shells, and have described the same in the following specification, illustrated by the accompanying drawings.

My invention relates in general to a class of machines for molding and baking pastry of various kinds, which includes ice cream cone machines, so-called, in which pairs of coacting dies mold a plastic batter into the form of hollow cone-shaped receptacles for icecream, and retain the batter in that form while baking. An illustrative example of machines of this type, and of their general mode of operation, is found in the application of William J. Rumple, No. 655,497 which was filed in the United States Patent Office, October 19,.1911, for a patent for improvements in machines for making pastry.

It is the object of the invention to increase the efficiency of machines of this kind; to operate the male dies or upper molds thereof by positive movements in a superior manner; to improve the distribution of the batter to the lower molds; to control and economize the distribution of baking heat to the upper molds; to prevent the support of the upper molds from becoming distorted by the heat of repeated bakings; to render the lower molds easily removable from the machine, and easily replaced, when desired, by other molds, of the same or different patterns; to provide for the escape of steam from between the coacting molds whenever baking begins; to indicate to the operator the expiration of predetermined periods allowed for baking the pastry; and in general to produce superior machines for making pastry shells.

To accomplish these results, I construct the lower molds of my improved pastry machine independently of the ovens in which they are seated, and fasten them therein separately; cause the frame that carries the upper molds to be raised and lowered by racks and pinions, moving in unison; supply batter to the lower molds through a tubular faucet leading from a movable batter tank; heat the upper molds by conduction from their heated shanks; insulate the same from their supports; provide yielding and resilient means for locking the male and the female molds together; and operate, by the movement of these molds, a signal to indicate the expiration of the times prescribed for baking.

The accompanying drawings show the best manner in which I have contemplated applying the principles of the invention; yet the latter is not restricted to any specific construction or arrangement of parts, excepting as limitations of that kind are either expressed or necessarily implied in the subjoined claims.

In these drawings Figures 1 and 2 are respectively a side elevation and a front elevation of an ice cream cone machine constructed in accordance with these principles; and the remaining figures are details. Fig. 3 is a plan of one of the upper molds fastened to the frame by which they are carried. Fig. 4 is a sectional side elevation of the same, together with a cap and heating devices for the upper mold. Figs. 5 and 6 are respectively a plan and a sectional elevation of a single upper mold having a modified form of shank and of heating devices. Fig. 7 is a side elevation of an upper part of the same machine, partly in section on the section line in Fig. 2. Fig. 8 is a vertical section of a single oven section and a single mold section therein. Fig. 9 is an axial section of the tubular faucet, and modified attachments of the tubular faucet, which leads from the batter tank. Fig. 10 is a central vertical section of an upper mold having heating devices of a modified type. Fig. 11 is a side elevation of the same machine having the molds and cores locked together in baking position. Fig. 12 is a detailed front elevation of a portion of the means for locking the dies.

In this illustrative machine, the lower molds and the upper molds are mounted respectively on the main frame 1 and the vertically reciprocable frame 2. The main frame comprises the base denoted by the same numeral 1, the upright tubular posts 3, the brackets 4, and 5 and 23, projecting from those posts, and the cross-piece 30 by which the posts are connected. The reciprocable frame 2 comprises the duplicate rackbars 6, which work vertically in the hollow posts 3, and the horizontal head-piece, denoted by the same numeral 2 and connecting the rackbars. Operatively the reciprocable frame 2 is raised and lowered by means of the crank 7 of the rockshaft 8, which is journaled in the brackets 4 and carries the pinions 9 meshing with the racks 6. The counter weight 87, suspended by the rope 88 running in the grooved pulley 89 keyed to this rockshaft, facilitates the movement of this frame.

The lower molds 10 are conical metallic shells split axially into sections, or duplicate half molds, denoted by the same numeral 10, and removably seated in the oven 11. This oven is a rectangular metallic shell, split in a vertical plane into separable duplicate and integrally formed sections, or half ovens, denoted by the same numeral 11. Each of these oven sections is a metallic shell, of general rectangular form, comprising the horizontal top and bottom plates 50, the vertical end walls 51, the lower inner wall 52, the upper outer wall 53, the lower draft opening 15 under the wall 53, and the upper draft openings 54 through that wall.

In the lower part of each of the oven sections, and opposite the draft opening 15, is fixed longitudinally a horizontal gas-pipe 16, having numerous ports, or burners 17, for discharging flame into the oven. In the same oven sections, and in the sockets 75 and 76 which are formed respectively in the top plates 50 and the inner walls 52 thereof, the mold sections 10 are seated in the registering positions indicated. In these positions they are removably secured by the screws 12 inserted through the walls 53 and through the internal bosses 13, and taking into the abutting bosses 14 formed on the backs of the mold sections. These oven sections are slidably mounted in upright and mutually registering positions upon the horizontal two-rail track which is formed by the alining top surfaces of the brackets 4.

For the purpose of operatively moving the mutually registering oven sections 11, with the contained mold sections 10, to and from each other on this track, the oven sections are provided respectively and at each end with the horizontal arms 18, which are reciprocable longitudinally in the keepers 19 on the posts 3, and these arms are attached by the connecting rods 20 to the crank-pins of the double cranks 21 on the rockshaft 22, which has bearings in the brackets 23, and is worked by the lever 24.

For the purpose of locking the registering oven sections together when slidden into mutual contact by manipulation of this lever, the crank disks 21 are provided with peripheral ratchet notches and with the pawls 25.

For the purpose of clamping together the registering sections of the oven, as well as the molds contained therein, the entire oven is provided with a central transverse vertically prolate perforation 26, occupied by the horizontal rockarm 27; and this rockarm, which is journaled in the crosspiece 30, is provided with a lever arm 28 and carries two fixed buttons 29, narrower than the holes 26 and having beveled inner faces as shown in Fig. 7. These buttons engage the oven sections externally and pinch them together, or disengage the same, according to the angular position given to the rockarm by its lever arm 28.

The upper molds 31, in their preferred form, shown in detail in Fig. 4, are solid metallic cones, pointing downward and provided each with a peripheral shoulderpiece 32, and with a chambered shank extending upward from the shoulderpiece and consisting of the marginal prongs 33. The shank 33 occupies without contact a hole 36 through the headpiece 2; while the shoulderpiece 32 is fastened to the same headpiece by the screws 34, but is insulated therefrom by the interposed layer of asbestos, or the like, 35, to prevent the loss of heat from the mold by conduction. On the underside of the headpiece 2 are formed the descending arms, or branches, 37. These have respectively the vertical sides 38, facing toward each other, and the beveled free ends 39 inclined downwardly away from each other, as shown in Fig. 7, and are adapted to clasp the oven 11 and to press the oven sections together whenever the upper molds are lowered into position in the lower molds. Each of the upper molds is separately heated by conduction from its shank, which is itself heated by a Bunsen burner.

In its preferred form the shank denoted by the numeral 33 in Fig. 4 is hollow and has peripheral prongs denoted by the same numeral 33; while the Bunsen burner 40 is dependent into the internal chamber which is surrounded by these prongs. Each of these burners is supplied with gas, from a suitable gas receptacle not shown in the drawings, by means of the flexible pipe 41 and the connected distribution pipe 42, which is carried by the head-piece 2 and is immediately connected with the burners. Gas from the same source is supplied to the heater pipe 16 by the pipe 64. To retain the heat of the burner 40, a metallic cap 43, centrally perforated to admit the nozzle of this burner, may be placed on the top of the shank 33, as shown in the same Fig. 4.

A different form of shank for heating the upper mold is illustrated in Figs. 5 and 6, and comprises the cylindrical axial core 44, and the incompletely encircling wall 45, forming with that core an intermediate annular chamber 46 into which the jet from the burner 40' is discharged in a horizontal direction approximately tangential to the core. Yet another form of shank for the same purpose is shown in Fig. 10, comprising an upwardly projecting solid axial core 47, formed of copper or other metal having great conductivity of heat, the jet being directed horizontally against the exposed portion of the core.

The means for supplying batter to the lower molds comprise the batter tank 48 having the horizontal tubular faucet 49. This tank is open at the top to receive the batter, is mounted movably on the bracket 5 and is adapted to rotate about its central vertical axis. The faucet comprises two coaxial pipes, namely, the outside pipe, which is denoted by the same numeral 49, and the inside pipe 55, occupying the entire length of the pipe 49. The pipe 49 projects radially from the tank and has the terminal flanged collar 56. It also has in its underside a number of downwardly opening ports 65, which are adapted to register respectively and co-axially with the lower molds. The pipe 55 has the similarly positioned ports 66, registering with the ports 65, and constitutes a tubular valve and batter pipe. It has also the terminal cap 67 normally contacting with the flanged collar 56, but is easily removable from the pipe 49 for cleaning.

The cap 67 has a radially directed lever arm 57 connected by the link 58 with the similar rock-arm 59, which is carried by the rockshaft 60; the latter having the lever handle 61, and having bearings both in opposite walls of the tank, and in the spacing arm 62 of the collar 56. In the modified form shown in Fig. 9, the cap 67 carries a hook 68 which is adapted to engage the collar 56 and thereby to hold the collar 56 and the cap 67 in contact with each other. By this faucet the discharge of the batter into the lower molds is effected in close proximity thereto, and the drip therefrom, occurring when that discharge is stopped, is reduced to a minimum. The chute 69 is located under the ovens, and attached to the brackets 4; while the endless conveyer 70 runs below the end of the chute. The timing signal shown in Fig. 1, and mounted on one of the posts 3, comprises the hammer 71, the gong 72, the clock or other operating mechanism 73, and the controlling lever 74, which is positioned in the path of one of the rackbars 6. It is silent when this lever is undisturbed, but is sounded whenever this lever, having been displaced by the descending rackbar, has remained so displaced during the predetermined period of time necessary for a single baking.

Means for locking the male and the female dies yieldingly and resiliently together are shown in Figs. 1, 2 and 12, and comprise the bent lever 77 pivoted to one of the posts 3 by the pin 90 and normally occupying, when not in use, the position shown, the pin 78 projecting from this lever and rotarily movable therein, the ring 91 formed on the free end of this pin, the shaft 79 slidable in this ring, the stop nut 92 on one end of this shaft, the shoe 81 formed on the other end of the same shaft and movable into and out of the path of the crank 7, the angular slot 82 formed in this shoe, the guiding stud 83 projecting from the post 3 and working in this slot, and the spring 84 encircling the shaft 79 and resiliently forcing the shoe 81 from the ring 91.

The machine so constructed is obviously adapted to enlargement by increasing the number of molds and ovens.

In using this machine, the operator, by turning the crank 7, raises the frame 2 to the position shown in Figs. 1 and 2; then by depressing the lever 24 he slides the oven sections together in the position shown in Fig. 1, in which position they are locked by the action of the ratchet and pawl 25; then by turning the hand lever 28 he further clamps and buttons together the entire oven, including the mold sections, which are seated therein; then he moves the batter tank by hand to the position shown; whereby the ports 65 of the faucet 49 are brought into vertical axial registration with the lower molds respectively; then imparting a slight rotary movement to the valve 55 by the hand lever 61, he opens the ports 65, permitting a suitable supply of batter from the tank 48 to drop simultaneously into the several lower molds; then by a reverse movement of the lever 61 he closes the ports 65; then he moves the batter tank so as to carry the faucet 49 aside from the path of the upper molds; meanwhile by lighting all the burners 40 and 17 he heats all the molds, male and female; then by a reverse movement of the crank 7 he lowers the upper molds into the batter in the registering lower molds, where they are stopped in the positions shown in Fig. 7 by the shoulderpieces 32, contacting with tops of the lower molds; thereby he causes the arms 37 to hug and hold the sides of the oven 11; by the same act he causes the batter in the lower molds to be molded into the prescribed conical form, and by the same act causes the rackbar 6 to displace the controlling lever 74 of the alarm; then by hand he depresses the lever 77 against the stop pin 85 thereby carrying the pin 78 past the dead center between the pin 90 and the shoe 81 and moving that shoe outward into locking contact with the crank 7, which is locked thereby in the position shown; by thus locking the male and the female molds resiliently together he permits them to separate elastically from each other a short distance for the escape of steam from the batter as the baking begins; then he permits the pastry cones formed between the upper and lower molds to bake until the gong is struck by the hammer 72; then by a reverse movement of the lever 77 he releases the upper and the lower molds from each other; then he withdraws the upper molds from the lower molds by raising the frame 2 in the manner above prescribed; then he releases the oven from the grasp of the buttons 29 by a reverse movement of the hand lever 28, and separates the oven sections, as well as the mold sections, from each other by a reverse movement of the crank 7; whereupon the finished cones drop into the chute 69 and are thereby delivered to the conveyer 70.

I claim as my invention—

1. A machine for making pastry, comprising separable oven sections, separable mold sections seated removably in the oven sections respectively, a track supporting the oven sections, and means for moving the oven sections toward and from each other on the track.

2. A machine for making pastry, comprising a pair of mutually registering oven sections, a plurality of mutually registering mold sections, formed separately from the oven sections and seated therein, a support for the oven sections, means for moving the oven sections toward and from each other on the support, and a means for locking the oven sections together.

3. A machine for making pastry, comprising a pair of mutually registering oven sections, a plurality of mutually registering mold sections seated removably in the oven sections, a track for the oven sections, means for reciprocating the oven sections on the track, and heating means seated in the oven sections.

4. A machine for making pastry, comprising separable oven sections, separable mold sections detachably seated in the oven sections, means for moving the oven sections toward and from each other, and means for tying the oven sections together.

5. A machine for making pastry, comprising two mutually registering and separable oven sections, mutually registering mold sections detachably seated in the oven sections respectively, a track supporting the oven sections, means for moving the oven sections to and from each other on the track, and means for tying the oven sections together.

6. A machine for making pastry, comprising a vertically reciprocable mold-carrying frame, separable and mutually registering oven sections, separable mold sections carried by the oven sections, and a pair of dependent arms which are carried by the frame and are adapted to engage the oven sections and to hold them together.

In testimony whereof, I hereunto subscribe my name in the presence of two witnesses.

LEE C. SHARP.

Witnesses:
L. G. THOMPSON,
WILLARD EDDY.